United States Patent
Kim et al.

(10) Patent No.: US 8,730,988 B2
(45) Date of Patent: May 20, 2014

(54) METHOD OF ALLOCATING LOGICAL CHANNELS IN WIRELESS SENSOR NETWORK

(75) Inventors: Eui-Jik Kim, Suwon-si (KR); Jeong-Sik In, Yongin-si (KR); Hyo-Hyun Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 922 days.

(21) Appl. No.: 12/613,228

(22) Filed: Nov. 5, 2009

(65) Prior Publication Data

US 2010/0118812 A1    May 13, 2010

(30) Foreign Application Priority Data

Nov. 7, 2008  (KR) .................. 10-2008-0110301

(51) Int. Cl.
*H04J 3/16*    (2006.01)

(52) U.S. Cl.
USPC ............ 370/437; 370/252; 370/329; 370/341

(58) Field of Classification Search
USPC .................. 370/252, 329, 341, 437
See application file for complete search history.

(56) References Cited

U.S. PATENT DOCUMENTS

| 6,131,033 | A  | * | 10/2000 | Shi .............................. 455/446 |
| 7,782,831 | B1 | * | 8/2010 | Feeney ........................ 370/347 |
| 8,265,045 | B2 | * | 9/2012 | In et al. ...................... 370/337 |
| 2005/0135324 | A1 | * | 6/2005 | Kim et al. ................... 370/343 |
| 2009/0252178 | A1 | * | 10/2009 | Huttunen et al. ............ 370/445 |

OTHER PUBLICATIONS

Gang Zhou et al., "MMSN: Multi-Frequency Media Access Control for Wireless Sensor Networks", 2006.
Chen Xun et al., "A Multi-Channel MAC Protocol for Wireless Sensor Networks", Proceedings of the Sixth IEEE International Conference on Computer and Information Technology (CIT'06), 2006.
IEEE Std 802.15.4, Part 15.4: Wireless Medium Access Control (MAC) and Physical Layer (PHY) Specifications for Low-Rate Wireless Personal Area Networks (WPANs), IEEE Standard Systems—Local and Metropolitan Area Networks—Specific Requirements, Jun. 2006.

* cited by examiner

*Primary Examiner* — Christopher Grey
(74) *Attorney, Agent, or Firm* — The Farrell Law Firm, P.C.

(57) ABSTRACT

A method of allocating logical channels in consideration of an interference range in a wireless sensor network includes defining logical channels to increase the number of available channels and determining the number of logical channels in accordance with the number of nodes within an interference range, allocating the logical channels to the nodes within the interference range so that the determined logical channels do not overlap each other, and exchanging data among the nodes using the allocated logical channels.

15 Claims, 6 Drawing Sheets

METHOD OF ALLOCATING LOGICAL CHANNELS IN WIRELESS SENSOR NETWORK

PRIORITY

This application claims priority under 35 U.S.C. §119(a) to an application entitled "Method Of Allocating Logical Channels In Wireless Sensor Network" filed in the Korean Industrial Property Office on Nov. 7, 2008 and assigned Serial No. 10-2008-0110301, the contents of which are incorporated herein by reference.

BACKGROUND OF THE INVENTION

1. Field of the Invention

The present invention relates generally to a wireless sensor network, and more particularly to a method of allocating multi-channels in a wireless sensor network using the multi-channels.

2. Description of the Related Art

Substantial research has been performed on multi-channel Medium Access Control (MAC) protocols for improving the performance of an ad-hoc network for use in a computer, which is a type of wireless network. However, there is a problem with such ad-hoc network protocols in that it is difficult to directly apply them to an ad-hoc network due to the characteristics of a sensor network, such as insufficient resources, computing power, and cost. Accordingly, there has been substantial research on several multi-channel MAC protocols suitable to a sensor network.

Among these multi-channel MAC protocols is the core technology of allocating multi-channels to respective nodes in a network, which is important to control the performance of the multi-channel MAC protocol. Conventional channel allocation methods by network environments will now be described.

In a wireless sensor network environment such as a Multi-Frequency MAC for wireless Sensor Network (MFSN) environment, each node in a network is allocated with an exclusive frequency or channel for receiving data through exchange of a channel allocation message with a neighboring node located within a 2-hop distance. In the MFSN environment, a fixed channel allocation method is used, and thus the number of available channels is fixedly determined in accordance with the corresponding network environment. This method is useful when the number of nodes within a 2-hop distance is smaller than the number of available nodes.

When the number of nodes within a 2-hop distance is larger than the number of available nodes, a random channel allocation method is used. In this case, channel collision occurs and deteriorates the performance of the network. That is, normal operation is performed when the number of available channels is larger than the number of nodes within a 2-hop distance. However, an overlapping channel is allocated to adjacent nodes causing channel collision when the number of available channels is smaller than the number of nodes within a 2-hop distance. In the network environment having a high node density, this phenomenon occurs more severely and causes substantial performance deterioration.

In a wireless sensor network environment such as a Multi-Channel MAC Protocol for wireless Sensor Network (MCSN), the entire network is divided into plural clusters, and a cluster member node requests a channel for data transmission and a time slot from a cluster head using an on-demand method when data to be transmitted is generated. The cluster head schedules a channel and use time based on such a request message, and allocates the channel and the use time to the cluster member that has requested the channel. However, this method has limitations in that it is useful only in a specified network environment adopting the clustering. That is, a separate clustering mechanism is required, and considerable time and energy may be consumed to perform the clustering mechanism, thus causing performance deterioration of the entire network. Also, since this method is useful only in the specified network using the clustering, the flexibility of the algorithm is decreased accordingly.

SUMMARY OF THE INVENTION

Accordingly, the present invention has been made to solve the above-mentioned problem caused by the insufficient number of channels in a sensor network environment, and the present invention discloses a method which defines logical channels, determines the number of logical channels according to the number of nodes within an interference range through node density estimation in the corresponding network, and allocates the logical channels to the nodes within the interference range.

In accordance with the present invention, there is provided a method of allocating logical channels in consideration of an interference range in a wireless sensor network, which includes defining logical channels to increase the number of available channels, and determining the number of the logical channels in accordance with the number of nodes within the interference range, allocating the logical channels to the nodes within the interference range so that the determined logical channels do not overlap each other, and exchanging data with the nodes using the allocated logical channels.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, embodiments of the present invention will be described with reference to the accompanying drawings. In the following description, various specific definitions found in the following description are provided only to assist in the general understanding of the present invention, and it will be apparent to those skilled in the art that the present invention can be implemented without such definitions. Further, a detailed description of known functions and configurations incorporated herein will be omitted for the sake of clarity and conciseness.

As previously explained in the existing channel allocation method, a normal operation is performed when the number of available channels is larger than the number of nodes within a specified distance, while if not, an overlapping channel is allocated to adjacent nodes to cause channel collision when data is transmitted. In order to solve this problem, the present invention defines logical channels, and discloses a method of allocating channels in consideration of an interference range using the defined logical channels.

The present invention provides a method of using multi-channels to solve the problem caused by insufficient channel resources, and further defines the logical channel in which frequency and time are combined to solve the problem of the insufficient number of channels. As described above, an exclusive channel must be allocated to each node in the interference range in order to avoid interference caused by the data transmission of the adjacent node in a wireless sensor network environment. However, if the number of nodes within the interference range is larger than the number of available frequencies of the corresponding network, the channels to be allocated become insufficient. By defining the logical channels, the number of available channels can be increased.

In the present invention, it is assumed that all nodes are synchronized in time, and the entire network is distributed in a nearly uniform state. The present invention will now be described based on foregoing logical channels.

Figure 1:
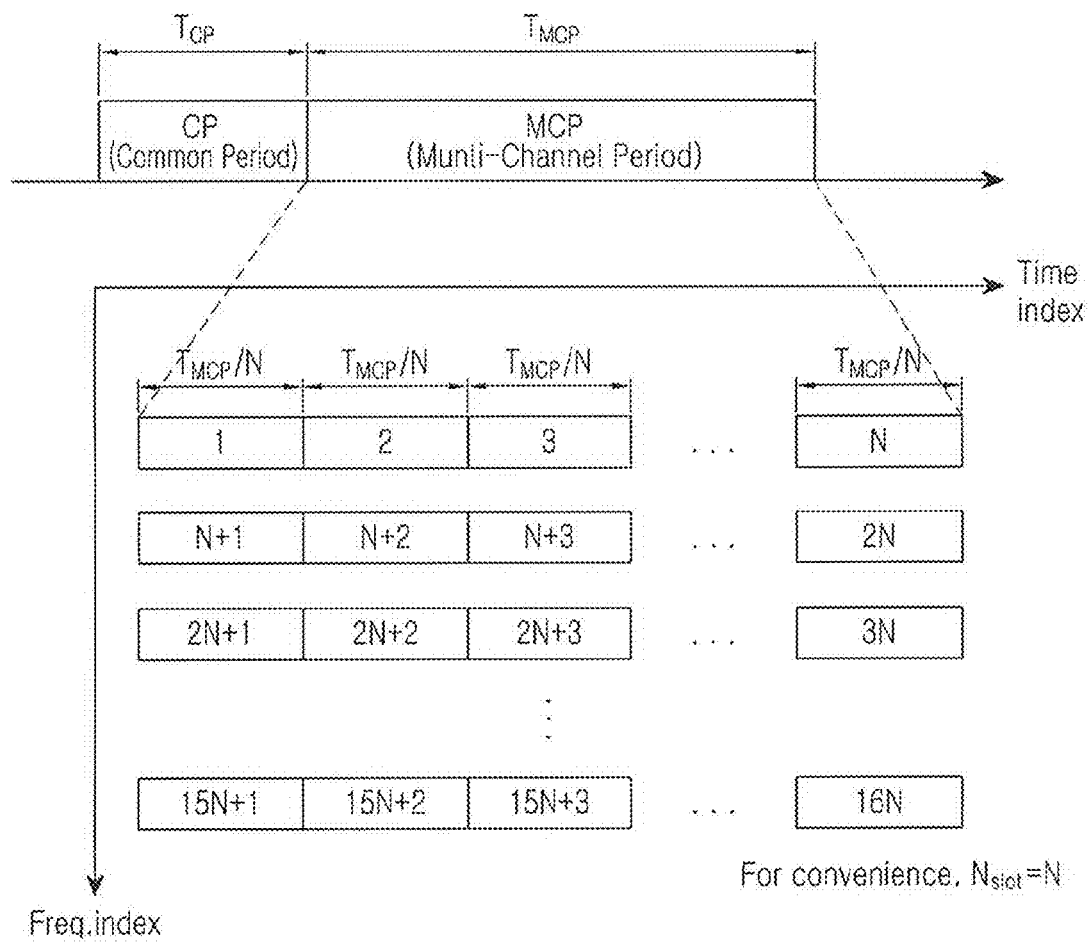
FIG. 1 illustrates a frame structure applied to the channel allocation according to an embodiment of the present invention.

FIG. 1 illustrates a frame structure applied to the channel allocation according to an embodiment of the present invention. The frame as illustrated in FIG. 1 will be applied after the entire channel allocation process to be described later is completed. When the channel allocation process is in progress, all nodes exchange messages through a common channel. For the sake of convenience in understanding, t is assumed that 16 non-overlap channels including one common channel and 15 multi-channels are provided in consideration of the IEEE 802.15.4 standard.

Referring to FIG. 1, the operation of a network is repeated in a frame period including a Common Period (CP) and a Multi-Channel Period (MCP). The CP of a specified length is provided at the start of each frame, and all nodes in the network operate in the predefined common channel in the CR The common channel performs a route setup and allocates the logical channels at the initial stage of forming the network, and assists in causing a new node to enter the CP during the operation of the network. The CP is a period for a new node that has newly come into the network or a recovery node.

As illustrated in FIG. 1, the logic channel is composed of a frequency index and a time index. When the present invention adopts the IEEE 802.15.4 standard as described above, the frequency index represents the order of 16 non-overlap channels, and the time index represents the time order in the multi-channel period. The basis of dividing the time order at maximum in the time index is determined by "N(slot)," and a method of obtaining N(slot) will now be described.

If N(slot) is determined, the multi-channel period is uniformly divided into N equal parts. If it is assumed that the present invention adopts the IEEE 802.15.4 standard, selectable logical channels, the number of which is 16N(slot), are generated. If a certain node is allocated with or selects one logical channel, the frequency, which operates in a periodic frame, and the time, are determined. For example, if a certain node is allocated with or selects the logic channel "14N(slot)+2", the corresponding node uses the frequency number 14 and the second slot of the multi-channel period in the frame.

In FIG. 1, the number of logical channels is determined by N(slot). The required number of logical channels is determined by the number of nodes in the interference range. If the number of the defined logical channels is much larger than the number of nodes in the interference range, the time in the frame is divided into too many parts, or the entire length of one frame becomes too long and increases the waiting time. By contrast, if the number of defined logical channels is much smaller than the number of nodes in the interference range, an overlapping channel allocation in the interference range is inevitable, causing performance deterioration due to collisions occurring during data transmission.

Accordingly, the present invention discloses a method of determining N(slot), which determines the number of logical channels, in accordance with the number of nodes in the interference range through node density estimation.

Before the node density estimation is performed, a certain node in the network is set as the Topology Management Center (TMC). For accurate node density estimation, TMC is positioned in a part that is not: the edge of a deployed sensor field, and it is not necessary that the TMC be a sink node. That is, any node can be the TMC, and this setting is determined before the arrangement of nodes.

The node density estimation is performed in the order of recognizing the number of nodes in a one-hop distance that corresponds to the transmission range, estimating the number of nodes in a k-hop distance that corresponds to the interference range, and then determining N(slot).

Figure 2:
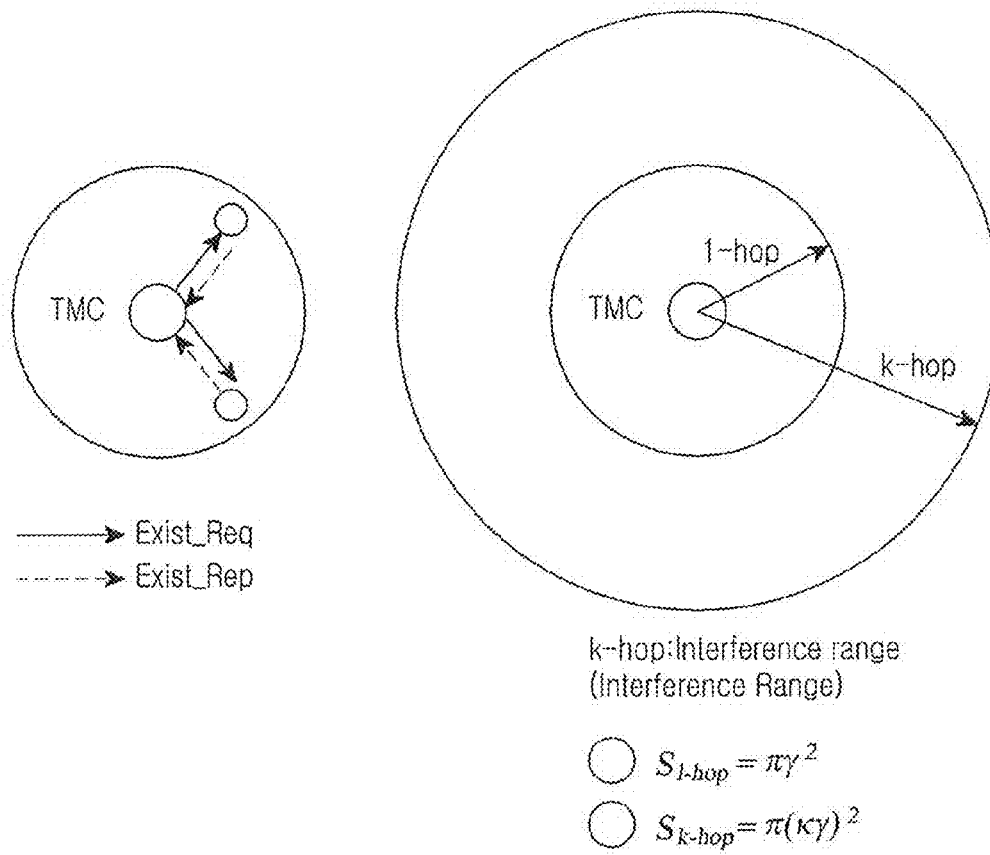
FIG. 2 illustrates node density estimation according to an embodiment of the present invention.

FIG. 2 illustrates the node density estimation according to an embodiment of the present invention.

If a channel allocation process starts to recognize the number of nodes in a one-hop distance, as illustrated in FIG. 2, TMC broadcasts an existence request message so that the nodes within a one-hop distance can receive the message in order to make nodes within a one-hop distance confirm the existence of the TMC. Upon receiving the existence request message from the TMC, a node sends an existence response message to the TMC. During the above-described process, TMC increases the node count by one using a timer whenever the TMC receives a response message from the nodes within a one-hop distance. If operation of the timer is discontinued, the TMC can recognize the number of nodes within a one-hop distance as in Equation (1) as follows.

$$\text{Node\_count} = N(1\text{-hop}) \tag{1}$$

In Equation (1), N(1–hop) indicates the number of nodes within a one-hop distance. When the number of nodes within a one-hop distance is obtained, the number of nodes within the interference range, i.e. within a k-hop distance, is estimated. As described above, if the interference range of nodes corresponds to k-hop when the nodes in the network are uniformly distributed, the number of nodes within the interference range can be obtained using Equation (2) as follows.

$$N(k\text{-hop}) = k \times k \times N(1\text{-hop}) \tag{2}$$

In Equation (2), N(k–hop) means the number of nodes within the interference range. Using Equation (1) and Equation (2) as obtained above, N(slot) is determined. The number of logical channels is larger than the number of nodes in the interference range, and if the number of currently available channels is N(channel), N(slot) is obtained by Equation (3) as follows.

$$N(\text{slot}) = [N(k\text{-hop})/N(\text{channel})] + 1 \tag{3}$$

If N(slot) is determined, TMC notifies all the nodes in the network of a Logical CHannel Setup (LCHS) message including N(slot). Upon receiving the LCHS message, the node can set the selection range of the logical channels.

Figure 3:
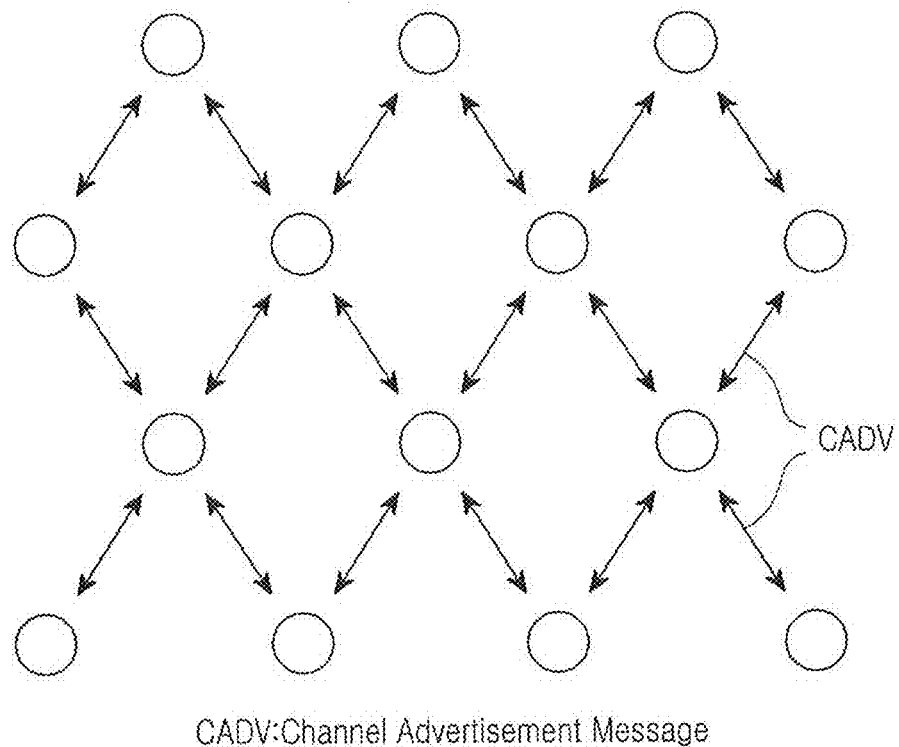
FIG. 3 illustrates the channel advertisement among nodes according to an embodiment of the present invention.

FIG. 3 illustrates channel advertisement among nodes according to an embodiment of the present invention. With reference to FIG. 3, it is also assumed that the present invention adopts the IEEE 802.15.4 standard.

After selecting a certain logical channel in the corresponding range, each node broadcasts a Channel ADVertisement (CADV) message including information about the selected logical channel to the neighboring nodes existing within a one-hop distance. In this case, each node maintains a channel table to store channel information of the neighboring nodes within the interference range, and updates the channel table whenever it receives a CADV message from the neighboring node. As illustrated in FIG. 3, the CADV message includes updated channel table information, and is periodically broadcast to the neighboring nodes within a one-hop distance.

If the node finds a channel overlapping its logical channel while it exchanges the CADV message with the neighboring nodes within the one-hop distance, it proceeds with a channel negotiation process.

Figure 4:
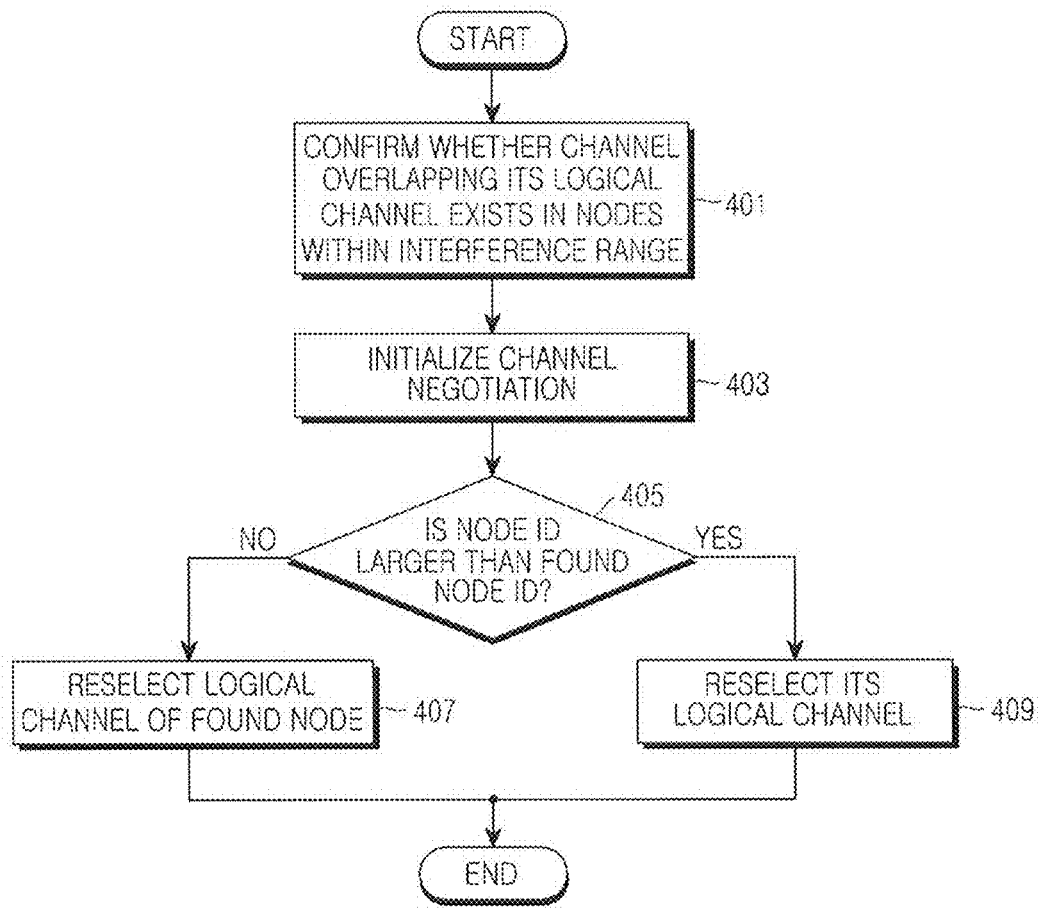
FIG. 4 illustrates the channel negotiation process when an overlapping logical channel is found according to an embodiment of the present invention.

FIG. 4 illustrates the channel negotiation process when an overlapping logical channel is found according to an embodiment of the present invention.

Referring to FIG. 4, upon selecting a certain logical channel, the node confirms whether any one of the nodes in the interference range has a channel overlapping its logical channel while it exchanges a CADV message with the neighboring nodes in step 401. If an overlapping channel is found, the node begins the channel negotiation process, and initializes the channel negotiation in step 403. If the channel negotiation is initialized, the node determines whether to reselect its logical channel in accordance with its node IDentifier (ID) in step 405. If its node ID is smaller than the ID of the corresponding node having the overlapping channel, the node has the priority, and proceeds to step 407. In this case, the node does not reselect the channel, but the found node reselects the logical channel. However, if its node ID is larger than the ID of the corresponding node having the overlapping channel, the node proceeds to step 409, and reselects its logical channel. The overlapping channel is excluded when reselecting the logical channel. If a new channel is selected as its logical channel, the node includes the newly selected channel in the next CADV message.

Since all the nodes in the network exchange CADV messages periodically, they perform the channel allocation process and the channel negotiation process, and no longer change their logical channels due to a lapse of time. Specifically, non-overlapping logical channels are allocated to or selected by the respective nodes, and the channel table thus becomes stable and the channel allocation is complete.

Figure 5:
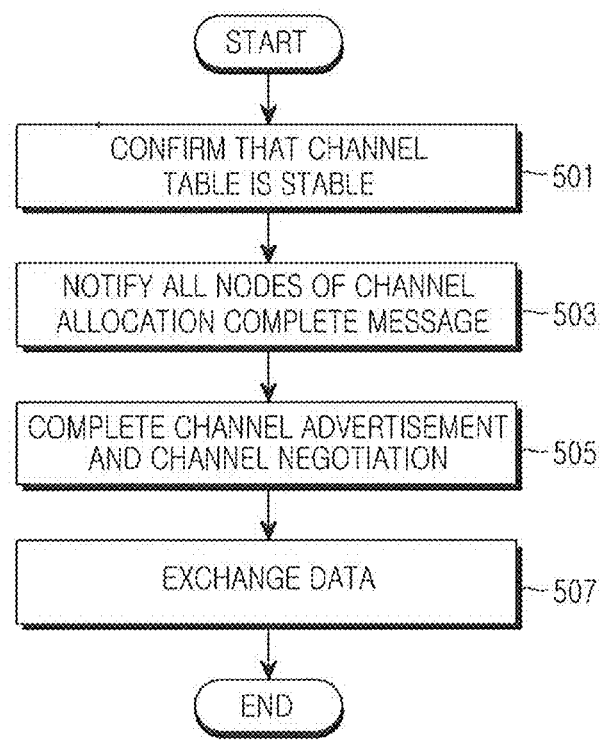
FIG. 5 illustrates a process of completing the channel allocation among nodes according to an embodiment of the present invention.

FIG. 5 illustrates a process of completing the channel allocation among nodes according to an embodiment of the present invention.

Referring to FIG. 5, if the channel table is not changed for a guard time, TMC judges that the channel table is stable in step 501 and proceeds to step 503 where the TMC notifies all the nodes belonging to the corresponding network of a channel allocation complete message after the lapse of the guard time. Here, the guard time taken before the channel allocation complete message is transmitted is a waiting time provided against the possibility that the channel table of another node is unstable. The channel advertisement and the channel negotiation processes are completed in step 505, and data is exchanged through the logical channels in step 507.

Figure 6:
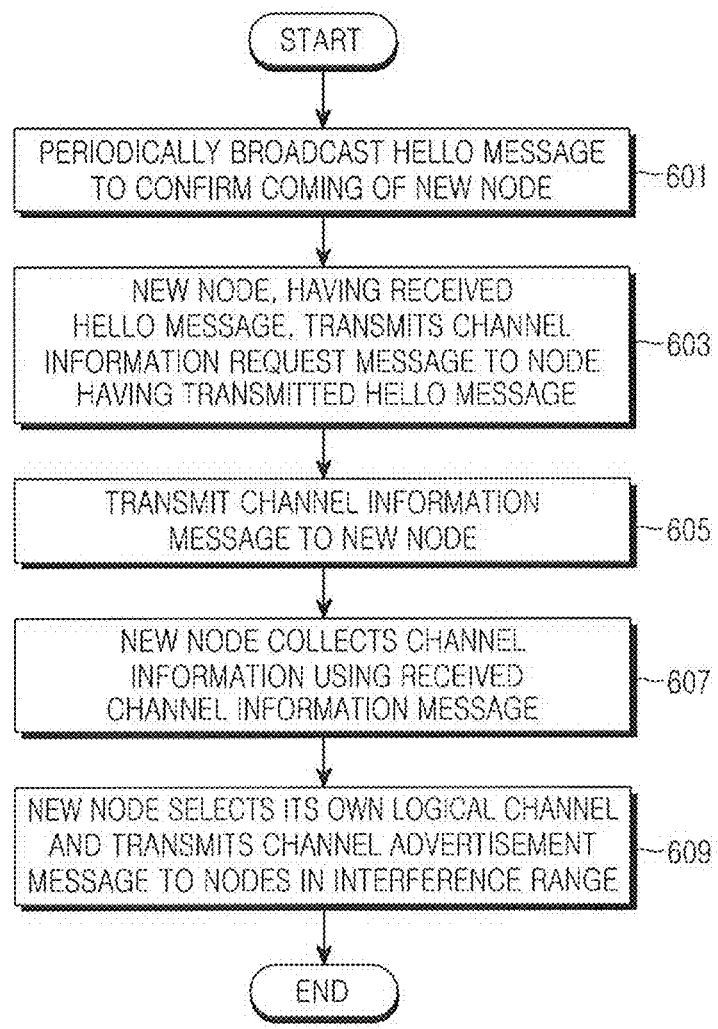
FIG. 6 illustrates a channel allocation process when a new node comes into the network according to an embodiment of the present invention.

FIG. 6 illustrates the channel allocation process when a new node comes into the network according to an embodiment of the present invention.

If the channel allocation is complete, all the nodes in the network operate with the frame structure as illustrated in FIG. 1. Each node operates in a predetermined representative channel at the start of a representative period of each frame, and transmits a hello message. This hello message is a message for use in search for a new node coming into the network during the operation of the network.

Referring to FIG. 6, the corresponding node periodically broadcasts a hello message in order to confirm whether a new node has come into the network in step 601. The node, having newly come into the network, confirms whether a the hello message is received, it transmits a CHannel Information Request (CHInfo_Req) message to the corresponding node, having transmitted the hello message, to request channel information in step 603. The corresponding node, which has received the channel information request message from the new node, transmits a CHannel Information (CHInfo) message to the node to notify the node of the channel information of the corresponding node in step 605. Here, the CHInfo message includes updated channel table information of the corresponding node and the channel information of the corresponding node.

The new node receives for a period of time a channel information message from one or more neighboring nodes, in addition to the corresponding node, to collect the channel information in step 607. The channel information received from the respective nodes is used to update the channel table of the new node. Here, since the channel information is received after the channel allocation is completed in the network, it contains not only the channel information of the neighboring nodes but also the channel information of the nodes within the interference range.

The new node proceeds to step 609, and if the period of time elapses, it selects its own logical channel, and transmits the channel advertisement message to the nodes within the interference range of the CP. The channel advertisement message is broadcast for the k-hop that corresponds to the interference range.

As described above, the number of available channels in a network is increased through the definition of logical channels in a wireless sensor network environment, and the channel utility of the network is maximized by setting the logical channels through node density estimation. Also, collision between nodes due to interference is blocked through channel allocation in consideration of an interference range, and channel allocation to a newly coming node is easily performed through the setting of a common period in a periodic frame structure.

While the present invention has been shown and described with reference to certain embodiments thereof, it will be understood by those skilled in the art that various changes in form and detail may be made therein without departing from the spirit and scope of the present invention as defined by the appended claims.

What is claimed is:

1. A method of allocating logical channels in consideration of an interference range in a wireless sensor network, comprising:
defining logical channels through estimation of node density of nodes to increase a number of available channels, and determining a number of logical channels in accordance with a number of the nodes within the interference range;

allocating the logical channels to the nodes within the interference range in such a manner that the determined logical channels do not overlap each other; and exchanging data with the nodes using the allocated logical channels, wherein each logical channel comprises a frequency index and a time index, and wherein the node density is estimated by using the interference range of the nodes and a number of adjacent nodes being recognized through a message exchange among the adjacent nodes.

2. The method as claimed in claim 1, wherein channels fixed by frequencies are divided by a number of times to increase the number of available channels.

3. The method as claimed in claim 1, wherein the number of logical channels are determined in accordance with the number of nodes within the interference range through the node density estimation of the nodes included in the corresponding network.

4. The method as claimed in claim 1, wherein the estimation of the node density comprises:

obtaining a maximum value of a time index of the logical channel using an estimation of the nodes in the interference range using the number of adjacent nodes and the interference range of the nodes, and obtained by further using the number of physically available channels.

5. The method as claimed in claim 1, wherein in the allocation of the logical channels to the nodes within the interference range, the logical channels are allocated to the nodes within the interference range through exchange of the channel advertisement message among the nodes without the overlapping of logical channels.

6. The method as claimed in claim 5, wherein the exchange of the channel advertisement messages comprises:

selecting by each node a certain logical channel in the range of the logical channels;

transmitting the channel advertisement message including the selected logical channel information to the adjacent nodes that transmit and receive data; and storing the received logical channel information of the adjacent nodes in a channel table of the node.

7. The method as claimed in claim 6, wherein when the each node finds a channel overlapping its logical channel among the channels of the nodes within the interference range while it transmits and receives a channel advertisement message to and from the adjacent nodes, a priority is granted to either of the node within interference range and the adjacent node through channel negotiation.

8. The method as claimed in claim 7, wherein the channel negotiation process comprises:

confirming identifiers of the two nodes when the overlapping channel is found; and selecting the logical channel by the node of the two nodes which has the identifier, which identifier is smaller than the identifier of the other node of the two nodes.

9. The method as claimed in claim 5, wherein the exchange of channel advertisement messages among the nodes is performed until the logical channels of all the nodes no longer change.

10. The method as claimed in claim 1, wherein all the nodes in the network periodically operate in the unit of a frame, and the frame is divided into a common period and a multi-channel period.

11. The method as claimed in claim 10, wherein in the common period, all the nodes in the network operate through a common channel predefined by a user, and the common channel allocates the logical channels.

12. The method as claimed in claim 1, wherein when a new node comes into the network during the operation of the network, the new node exchanges a channel information message with the adjacent nodes, and selects its own logical channel.

13. The method of claim 12, wherein all the nodes in the network confirm whether the new node has come into the network by transmitting a hello message through a predetermined common channel in the common period of each frame.

14. The method as claimed in claim 12, wherein the process of exchanging the channel information message comprises:

transmitting by the new node, having received the hello message, a channel information request message to the transmission node that transmitted the hello message;

notifying by the transmission mode, the new node of its own channel information by transmitting the channel information message to the new node;

collecting by the new node the channel information by receiving the channel information message from the adjacent nodes for a guard time; and selecting by the new node its logical channel based on the collected channel information, and notifying the nodes within the interference range of the selected logical channel.

15. The method as claimed in claim 14, wherein the new node stores the received channel information in a channel table.

* * * * *